United States Patent [19]

La Rocca

[11] Patent Number: 4,755,652
[45] Date of Patent: Jul. 5, 1988

[54] METHOD AND APPARATUS FOR WELDING THIN METAL SHEETS

[75] Inventor: Aldo V. La Rocca, Moncalieri, Italy

[73] Assignee: Fiat Auto S.p.A., Turin, Italy

[21] Appl. No.: 767,541

[22] Filed: Aug. 20, 1985

[30] Foreign Application Priority Data

Aug. 20, 1984 [IT] Italy ............................. 67833 A/84

[51] Int. Cl.$^4$ ............................................ B23K 26/00
[52] U.S. Cl. .............................. 219/121.64; 219/91.2; 219/87; 219/121.63; 219/121.14
[58] Field of Search ................. 219/121 LA, 121 LB, 219/121 LM, 121 LD, 121 LC, 121 LU, 121 LV, 121 LX, 121 EM, 121 ED, 91.2, 87

[56] References Cited

U.S. PATENT DOCUMENTS

| | | | |
|---|---|---|---|
| 1,281,454 | 10/1918 | White | 219/91.2 |
| 2,379,187 | 6/1945 | Richards | 219/119 |
| 3,474,219 | 10/1969 | Steigerwald et al. | 219/121 LD |
| 3,619,550 | 11/1971 | Matthews | 219/121 LU |
| 3,969,604 | 7/1976 | Baardsen | 219/121 ED |
| 4,237,363 | 12/1980 | Lemelson | 219/121 LD |
| 4,354,090 | 10/1982 | Nilsen | 219/121 LD |
| 4,626,653 | 12/1986 | Sciaky et al. | 219/121 LD |

FOREIGN PATENT DOCUMENTS 0039491 3/1984 Japan ............................ 219/121 LD Primary Examiner—M. H. Paschall
Attorney, Agent, or Firm—Sughrue, Mion, Zinn, Macpeak & Seas

[57] ABSTRACT

There is described a method for welding thin metal sheets (A, B) by the localized heating of limited juxtaposed zones of the metal sheets to be welded to cause their fusion and to form spot welds (S). In each weld zone, the metal sheets (A, B) are heated and fused along a closed line so that each weld spot (S) has a substantially annular configuration in cross section in a plane parallel to the metal sheets.

This welding may be achieved for example with the use of a laser (2) produced by a laser source (1), or by electrical resistance welding with a pair of opposed electrodes (6, 7) the ends whereof which are intended to grip the metal sheets (A, B) are suitably shaped.

5 Claims, 4 Drawing Sheets

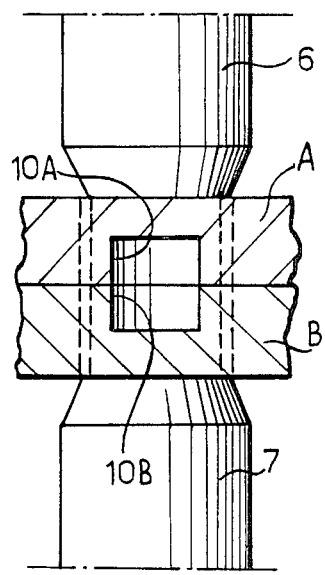
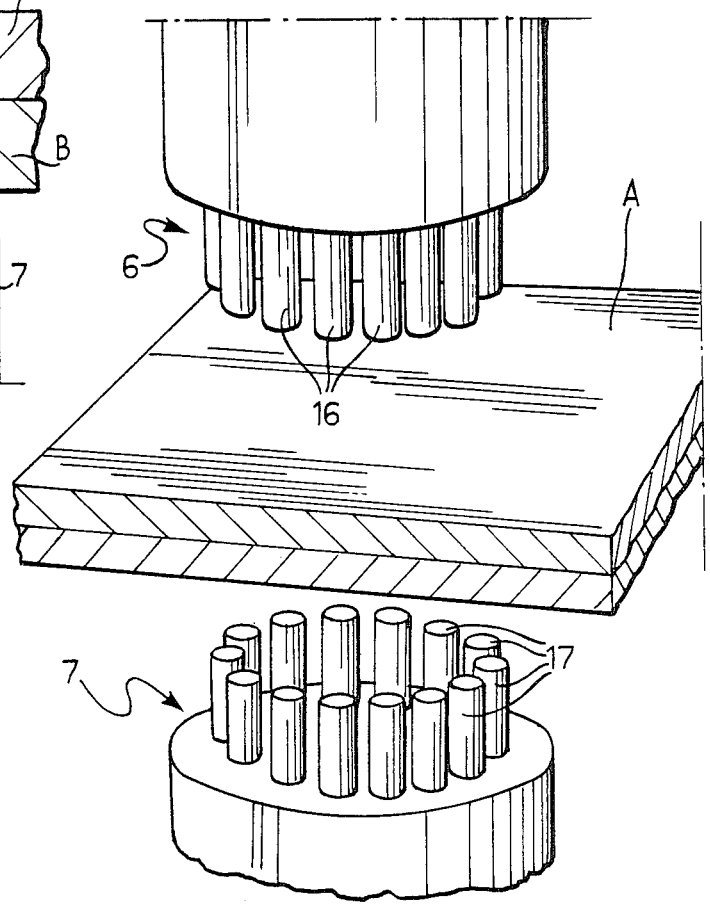
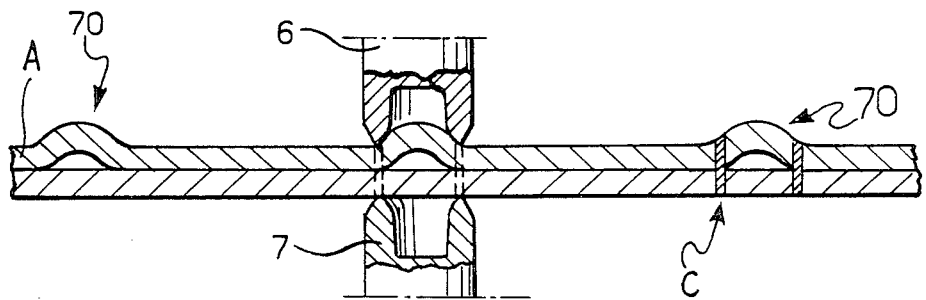

METHOD AND APPARATUS FOR WELDING THIN METAL SHEETS

The present invention relates to a method of welding thin sheet metal. In particular, the invention relates to a method of welding metal sheets by localised heating of limited juxtaposed zones of the metal sheets to cause their fusion and to form "spot welds".

STATE OF THE PRIOR ART

For the firm interconnection of metal sheets (for example to form box or shell structures) it is known to effect welding with "full" spot welds that is of the type illustrated by way of example in FIGS. 1 and 2 of the appended drawings. In these Figures two juxtaposed metal sheets A and B are joined by spot welds C. The spot welds C may be achieved, for example, by electrical resistance welding using a pair of electrodes (not shown) between which the metal sheets are gripped. Each spot weld C is substantially cylindrical and forms a monolithic body.

The spot weld of known type described above presents a zone of stress concentration when the welded structure of which it forms part is subject to stress: in general, the state of tension at the spot weld can reach values up to two to three times the magnitude of the maximum stress foreseeable under static conditions.

When a sturcture having "full" spot welds of conventional type is subject to vibrational loads (and, in general, to cyclic dynamic loads) the problem arises of possible failure of the spot welds or of their rupture by fatigue.

Indeed, when the location of use involves repeated impacts, vibrations, etc., these stresses generate oscillations which give rise to resonances and relative modal forms of oscillation of the structure formed by the metal sheets. The bending corresponding to several modal forms may have an amplitude of the order of the thickness of the metal sheet as is seen in FIG. 2. Clearly under these conditions strong concentrations of oscillating tensions which are variable in sign are created and cause fatigue of the spot welds.

The metallic and metallurgical characteristics of the material of the spot weld are usually poorer than the characteristics of the surrounding zones of the structure. Furthermore typical phenomena of erosion of an electrolytic nature due to the accumulation of scales, condensed residues and contaminants of various types facilitate microerosion and/or micro-cracks and their propagation, since the spot weld is usually more sensitive to the electrochemical phenomena indicated above. The spot welds are thus more readily inclined to break and hence are intrinsically not reliable in certain critical applications from the safety point of view or where very severe stresses arise under the conditions of use. This generally results in the need to make use of an excessive number of weld spots to ensure safety conditions.

In structural calculations, the "full" spot weld of conventional type is considered as a beam element having an infinite rigidity perpendicular to the metal sheets and tightly fixed thereto. If we consider two metal sheets joined by a series of successive spot welds disposed for example along a line, and if these metal sheets are stressed so that a spot weld at the end of the series of welds is loaded with a considerable shear force, this weld is prone to fracture ("fragile fracture") and the successive spot welds are likely to break in a chain. Indeed, after the breakage of a first spot weld, the shear force is transmitted to the successive spot weld, "rigidly" or totally, that is, without being at least partly absorbed in deformation work. The other spot welds may then yield, that is break in succession, so that the fracture propagates like a chain (domino effect).

OBJECT OF THE INVENTION

The object of the present invention is to provide a method for welding thin sheet metal of the type specified at the beginning which is able to avoid the disadvantages of spot welds of the prior art.

DESCRIPTION OF THE INVENTION

In order to achieve this object, the present invention proposes a welding process characterised in that in each weld zone the metal sheets are heated and fused along a closed line so that each spot weld has a substantially annular, preferably circular, configuration in cross section.

The weld thus effected, together with the metal sheets attached thereby constitute a type of "box" which is able to absorb part of the stress applied to the structure of which it forms part in an elastic-plastic manner. Thus for example, in the case of two metal sheets joined by a series of tubular spot welds according to the invention, disposed in succession along a line, the welds are able to absorb part of the applied stress in an elastic-plastic manner and thus are not subject to fragile fracture, and furthermore do not display the phenomenon of "rigid" or total transmission of the stress from one spot weld to the other and chain yielding.

The invention also relates to apparatus adapted to allow the welding method described above to be carried out.

DESCRIPTION OF THE DRAWINGS

Further characteristics and advantages of the invention will become apparent from the detailed description which follows, given with reference to the appended drawings, provided purely by way of non-limiting example in which:

FIGS. 8 to 11 show variants of execution of the welding method illustrated in FIG. 4.

DETAILED DESCRIPTION OF THE EMBODIMENTS

Figure 1:
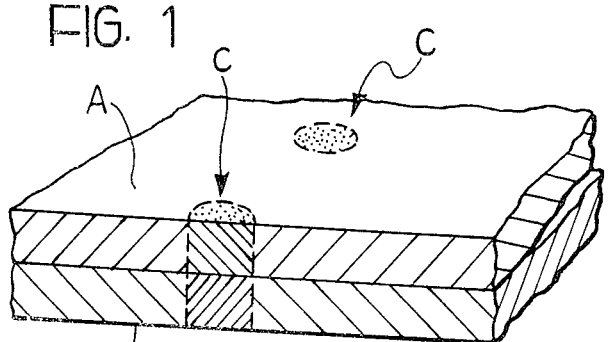
FIGS. 1 and 2, already described, show two sheet metal portions joined by "full" spot welds according to the prior art.
Figure 3:
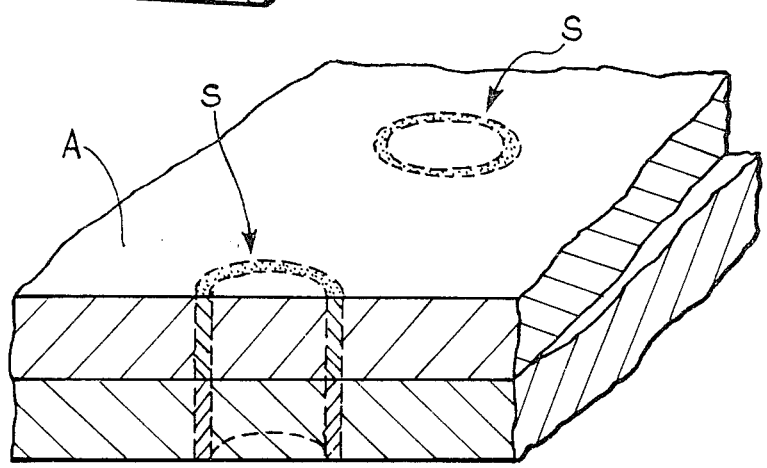
FIG. 3 shows two sheet metal portions joined by "tubular" spot welds according to the invention on an enlarged scale.
Figure 2:
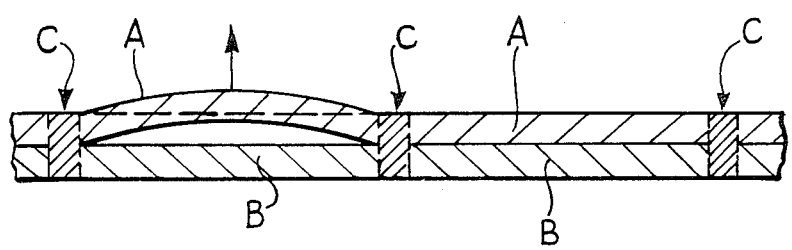

FIG. 3 shows two spot welds S effected by the method of the invention. The metal sheets A and B shown in this drawing have been heated locally and fused along a closed line which is substantially circular so that each weld spot S is constituted essentially by a tubular cylindrical element with an average radius of, for example, 2 mm.

Figure 6:
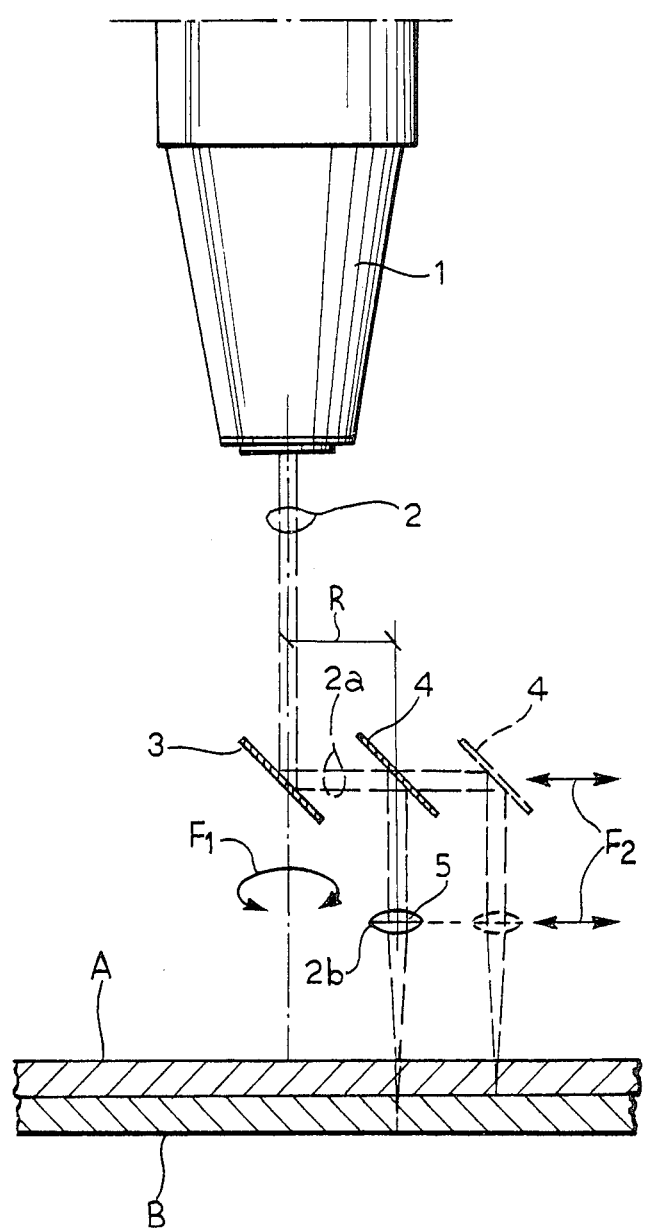
FIG. 6 shows schematically apparatus which can be used to effect spot welding of the type shown in FIG. 2.

In order to effect the spot weld S of FIG. 3 the apparatus shown in FIG. 6 may be used, according to a preferred embodiment. In this Figure, a laser source S is located above the metal sheets A, B and emits a laser beam 2 downwardly towards a first mirror 3 located at, for example, 45° to the axis of the beam 2. The laser beam 2a reflected from the mirror 3 is incident on a second mirror 4 which, in the embodiment shown schematically in FIG. 6 is parallel to the mirror 3. The ray 2b reflected from the mirror 4 passes through a lens 5 and is focused onto the upper sheet A.

The mirrors 3, 4 and the lens 5 are rotatable together with each other about the axis of the beam 2, as indicated by the arrows $F_1$ in FIG. 6. By means of the rotation of the optical system comprising these mirrors and the lens 5 it is thus possible to move the point of incidence of the beam emerging from the lens 5 along a circular line on the metal sheet A. It is thus possible to achieve a weld spot having a mean radius R corresponding essentially, in the embodiment illustrated, to the distance between the points of incidence of the laser beam on the mirrors 3 and 4. Preferably the mirror 4 and the lens 5 are movable together with each other relative to the mirror 3, as indicated by the arrows $F_2$ in FIG. 6. This may easily be achieved by means of a micrometric adjustment control of conventional type. Thus it is possible to vary the radius of the weld spots S.

An apparatus able to generate laser spot welds on an annular circular section is described in the patent application filed in Italy on the same date in the name of RTM-Istituto per le Ricerche di Tecnologia Meccanica e per l'Automazione.

Experimental tests carried out with the use of this latter apparatus and a 2.5 kW power Spectra-Physics source and with metal sheets having thicknesses varying between 0.8 mm and 2.5 mm have shown that tubular spot welds give the structure formed by the welded metal sheets greater strength, a better capacity to withstand impact and better fatigue behaviour than full spot welds of the conventional type, even when the "tubular" spot welds have a cross sectional area (strength area) less than or equal to a quarter/a fifth.

Figure 4:
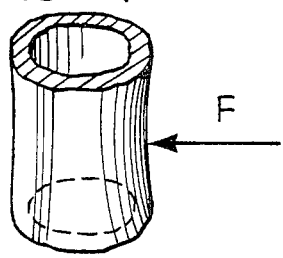
FIGS. 4 and 5 show the different shear behaviour of a tubular element and of a full element with the same section.
Figure 5:
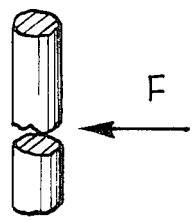

The improved capacity to withstand knocks and impact is illustrated in FIGS. 4 and 5 which show how a thin-walled tubular structural element (FIG. 4) is much more difficult to break by a concentrated impact, for example with a chisel, than a solid cylindrical structure having the same resistant section strength (FIG. 5).

A further advantageous characteristic, shown by the experimental tests carried out, lies in the high productivity which can be achieved with the use of a laser beam.

Figure 7:
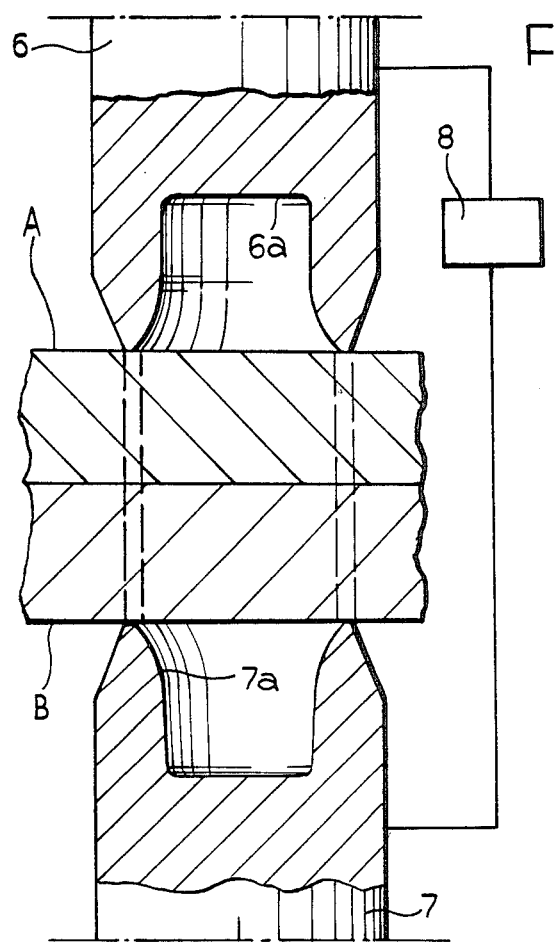
FIG. 7 shows a pair of electrodes for use in effecting tubular spot welding by electrical resistance welding.

The tubular spot welds according to the invention shown in FIG. 3 may also be formed by means of an electrical resistance welding process, as shown in FIG. 7. In this Figure, two opposing electrodes 6 and 7 are shown between which the metal sheets A and B to be welded are gripped. The electrodes 6 and 7 are connected to a power voltage supply 8 of conventional type. When this supply is energised a current is established between the electrodes 6 and 7 and passes through the metal sheets A and B. The region of the metal sheets A and B through which the current passes is heated strongly by the Joule effect and the material constituting this region is fused. Conveniently, according to the invention, the facing ends of the electrodes 6 and 7 have respective axial cavities 6a, 7b such that these ends have an essentially annular cross section. As a result of this shape of the ends of the electrodes, the current flowing through the metal sheets A and B is essentially in a tubular region: in this region the material and the metal sheets are fused and subsequently cooled, forming a monolithic structure constituting the tubular spot weld itself.

Figure 8:
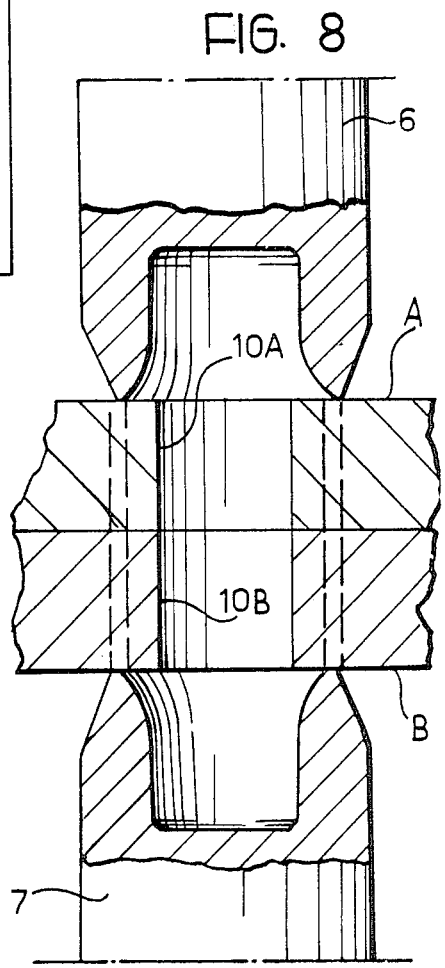

With the arrangement of the electrodes shown in FIG. 7, if problems of shunting arise or if the current paths in the metal sheets A, B tend to move towards the interior of the spot weld, a pulsed current can be supplied to the electrode 6, 7 so that the greater electromagnetic repulsion caused by the higher values of the average current means that the lines of current tend to move radially outwardly. Furthermore, recourse can also be made to solutions of the type illustrated in FIGS. 8 and 9. As is seen in these Figures, in order to avoid shunting problems, that is, movement of the current paths towards the centre of the spot weld (and hence to avoid the formation of a core in the zone which should otherwise be empty) in each weld zone, holes 10A, 10B of a diameter less than that of the spot welds which it is desired to form can previously be pre-formed These holes may also be only blind holes, as shown in FIG. 9, that is limited to the zones of interface between the metal sheets A, B.

Alternatively bosses 70 may be pre-formed in (at least) one of the metal sheets during the pressing of the metal sheets in the zones of welding. This solution is illustrated in FIG. 10.

FIG. 11 illustrates another alternative solution for achieving spot welds by means of electrical resistance welding. According to this solution, each electrode 6, 7 is constituted by an array of small needle or wire electrodes 17, 17 disposed along a closed line. The electrodes 16, 17 may be supplied with pulses sequentially or simultaneously by means of an electronic control circuit. Each electrode 16, 17 forms a small weld point: the spacing between the electrodes must be such as to allow the small weld points to be joined so as to form together the desired, spot weld.

I claim:

1. A method of welding thin superimposed metal sheets by localized heating of limited adjacent zones of said sheets in order to form spot welds in each zone comprising forming a hole in each of said zones prior to forming said spot welds wherein each hole has a cross section of dimensions less than the dimensions of the defined spot weld and subsequently heating said metal sheets by means of electrodes on opposite sides of said sheets in a substantially circular path to define a tubular spot weld extending through said thin superimposed metal sheets surrounding said hole.

2. A welding method according to claim 1 wherein said hole is a through hole.

3. A welding method according to claim 1 wherein said hole is a blind hole.

4. A welding method according to claim 1 wherein a blind hole is formed in each metal sheet in alignment with each other in the face of each sheet intended to be dispose adjacent to other metal sheet.

5. A welding method according to claim 1 wherein said hole is formed by forming a boss in the welding zone of at least one of said metal sheets wherein each boss has a radial dimension less than the diameter of the desired spot weld.

* * * * *